DISPENSING MECHANISM WITH TIME CONTROLLED FLOW

Original Filed April 4, 1949 4 Sheets-Sheet 1

INVENTOR.
Albert B. Mojonnier
BY
McCanna and Morsbach
ATTYS.

DISPENSING MECHANISM WITH TIME CONTROLLED FLOW
Original Filed April 4, 1949 4 Sheets-Sheet 2
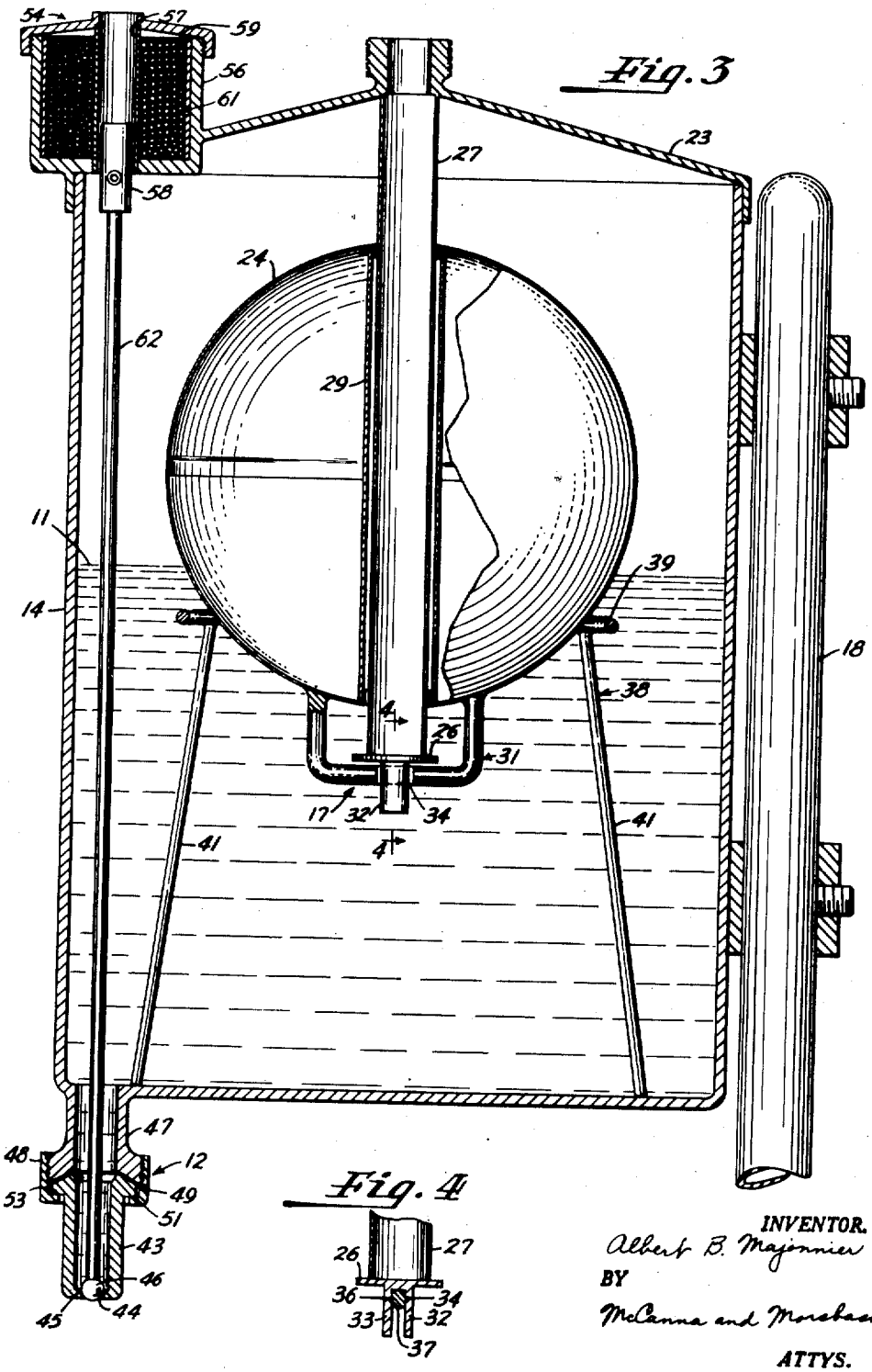
INVENTOR.
Albert B. Mojonnier
BY
McCanna and Morsbach
ATTYS.

DISPENSING MECHANISM WITH TIME CONTROLLED FLOW

Original Filed April 4, 1949 4 Sheets-Sheet 3

INVENTOR.
Albert B. Majonnier
BY
McCanna and Morsbach
ATTYS.

DISPENSING MECHANISM WITH TIME CONTROLLED FLOW

Original Filed April 4, 1949 4 Sheets-Sheet 4

INVENTOR.
Albert B. Mojonnier
BY
McCanna and Morsbach
ATTYS.

Reissued May 18, 1954 Re. 23,830

UNITED STATES PATENT OFFICE 23,830

DISPENSING MECHANISM WITH TIME CONTROLLED FLOW

Albert B. Mojonnier, Chicago, Ill., assignor to The Mojonnier-Dawson Co., a corporation of Illinois Original No. 2,667,990, dated February 2, 1954, Serial No. 85,278, April 4, 1949. Application for reissue February 24, 1954, Serial No. 412,406

7 Claims. (Cl. 222—67)

Matter enclosed in heavy brackets [ ] appears in the original patent but forms no part of this reissue specification; matter printed in italics indicates the additions made by reissue.

This invention relates to mechanisms for dispensing milk, whipping cream, beverages, syrup, paint, shellac, hand lotion, cosmetics, insecticides, powders, drugs, and other free flowing fluids and comminuted materials, and more particularly to mechanisms for dispensing such free flowing materials into containers.

Heretofore vacuum and plunger type dispensing mechanisms have been widely used. While a number of different types of these mechanisms have been available they have not always been satisfactory for all purposes, particularly for dispensing free flowing fluids. One of the disadvantages of prior constructions has been with respect to their accuracy, that is, being able to dispense within very close tolerances the same volume or weight of fluid upon successive operations of the dispensing mechanism. For example, vacuum dispensing mechanisms while fairly accurate for dispensing fluid into a container to a preselected level are not accurate insofar as volumetric displacements of free flowing fluids are concerned. Plunger type dispensing mechanisms are in general designed for accurately dispensing, from a volumetric displacement standpoint, pasty materials and solids and are not so accurate when utilized to dispense free flowing fluids.

Another drawback of prior constructions has been that they are in general designed for one particular application. Where a concern dispenses several different products it has been necessary, therefore, to have different dispensing mechanisms for each product. This is costly both in using space in a factory and in inventory of equipment. Where prior dispensing mechanisms have been adaptable for a variety of uses, they have not, in general, been designed so that the displacement of the mechanism can be quickly and accurately adjusted.

Moreover, most prior dispensing mechanisms have had the disadvantage that they have been so constructed that they are difficult to assemble, disassemble, clean and service. Prior constructions have been so complicated and have had so many small parts connected together that form small crevices, shoulders, and the like that it has been practically impossible to thoroughly clean them. As a consequence the attempted use of such mechanisms in the dairy and the like industries has met with disfavor. In many instances health officials have disproved the use of such dispensing units because milk passing through such units is subject to being contaminated since they cannot be thoroughly and adequately cleaned. Another industry which does not employ dispensing mechanisms to any great extent because they have been so hard to clean is the paint industry. Due to the wide variety of colors required to be stocked by a paint manufacturer, a paint manufacturer does not can large quantities of paint at one time. With available scientific instruments it is possible to match colors exactly. Consequently there is no need to store huge quantities of paint in a warehouse. Prior dispensers have been so complicated that it takes as long to thoroughly clean the dispensing equipment after a given color has been run through the dispenser as it does to manually dispense the paint into the cans. Also with prior constructions the amount of paint left in the dispenser at the end of a dispensing run is such that in many instances there is as much paint left over as is actually dispensed into the cans. Such left-over paint of course is a complete waste. Because of these disadvantages with prior dispensing mechanisms paint manufacturers have found that it is to their advantage both economically and practically to manually can paint.

An important object of the present invention is to provide a multi-purpose dispensing mechanism that may be used to accurately dispense volumetrically any free flowing fluid.

Another object of the invention is to provide a dispensing mechanism of the above character with novel means for dispensing to a high degree of accuracy predetermined volumes of fluid upon successive actuations of the dispensing mechanism.

Another object of the invention is to provide a dispensing mechanism of the above character that is of simple construction, that is relatively inexpensive to manufacture, that is easy to assemble and disassemble, and that requires a minimum of maintenance throughout its service life.

Another object of the invention is to provide a dispensing mechanism of the above character wherein the volume of fluid discharged from the mechanism may be quickly and easily changed to any desired volume within the limits of the dispensing mechanism.

Another object of the invention is the provision of means wherein the splash effected by discharging the fluid into a receptacle may be controlled.

Another object of the invention is to provide a novel dispensing mechanism of the above character that may be used on a wide variety of fluids.

Another object of the invention is the provision of a novel dispensing mechanism that has a minimum of parts arranged and constructed so that they can be thoroughly and readily cleaned.

Another object of the invention is the provision of a dispensing mechanism that is so arranged and constructed that it can be maintained in a sanitary condition.

Another object of the invention is to provide a dispensing mechanism of the above character wherein there is a minimum amount of fluid material left in the dispensing mechanism at the end of a dispensing run.

Other objects and advantages of the invention will become apparent from the following detailed description taken in connection with the accompanying drawings, in which—

Fig. 3 is a vertical section view taken through a solenoid operated discharge valve and float valve of the dispensing mechanism;

Fig. 4 is a sectional view taken substantially along the line 4—4 of Fig. 3, and Figs. 5, 6 and 7 show modified forms of the invention.

Figure 1:
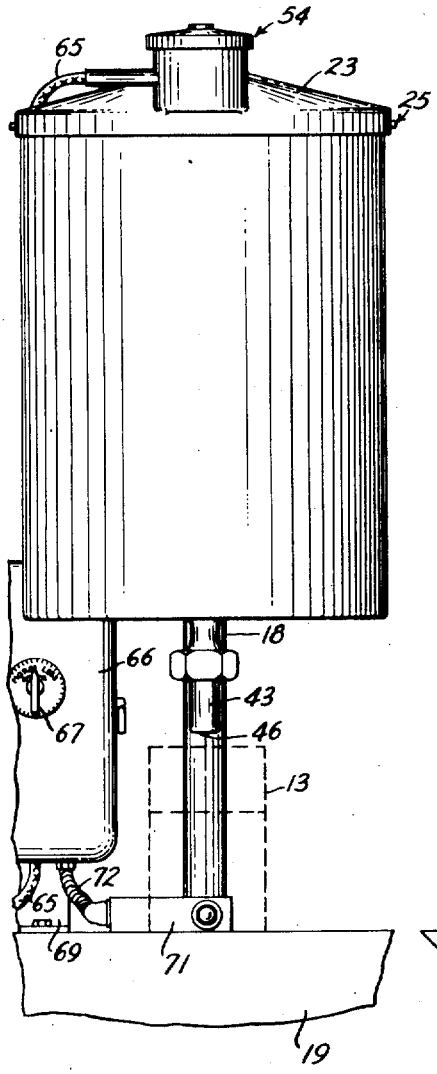
Figure 1 is a front elevation of a dispensing mechanism embodying the present invention.

For purposes of illustration the invention is shown embodied in a dispensing mechanism for free flowing fluids such as water, chemical solutions, milk, cream, solvents, liquid pastes, and the like. It is to be understood that these named fluids are by way of illustration only and this list is not intended to constitute a limitation on the applications of the dispensing mechanism to be hereinafter described. In general the dispensing mechanism comprises a constant level fluid supply 11 and a timer controlled valve means 12 for dispensing fluid from the supply into a desired receptacle 13.

As shown in Figs. 1–4 the means for establishing and maintaining the constant level fluid supply 11 comprises a container 14, a main liquid supply tank 16 and a float valve means 17 in the container 14 operable to permit it flow of liquid from the main supply tank 16 to the container 14 when the level in the latter is lowered, such as when the valve means 12 is opened to fill the receptacle 13. The container 14 may be adjustably mounted on an upright standard 18, rigid with a table or support 19, so that it may be moved to any desired vertical position above the table 19 to accommodate receptacles 13 of different heights. The container 14 may be of any suitable size, shape and material depending on the particular application involved. The main liquid supply tank 16 may be of any suitable size and shape preferably having a larger capacity than the container 14 and mounted above the latter. The tank 16 communicates with the container 14 through a suitable conduit 21. The latter is attached to the bottom of the tank 16 and to a boss 22 on a removable cap 23 forming the top of the container 14. With this construction liquid flows from the main supply tank 16 to the dispensing container 14 by gravity. Any other suitable means of supplying fluid from the main tank 16 to the dispensing container 14, such as by a pumping system may be used where desired. The cap 23 is positively positioned on the upper part of the container 14 by a pin and slot construction 25.

The float valve means 17 in this instance comprises a float 24 and a disc 26 shaped to seat on the end of a vertical extending tubular member 27. The latter is rigid with the cap and extends downwardly from the top of the cap. At its upper end the tubular member 27 is in communication with the conduit 21. As shown the float 24 is formed by two hemispherical members joined together in sealed relation. A vertically extending tubular member 29 forming a passageway shaped to receive the vertically extending tubular member 27 is rigidly supported by the hemispherical members and is in sealed relation therewith. Sufficient clearance is provided between the tubular members 27 and 29 to permit reciprocable movement of the float 24 in response to changes in liquid level in the container 14. This construction insures that the float is guided in its reciprocatory movement and insures seating of the disc on the end of the tubular member 27. The disc 26 is supported on the float 24 by a U-shaped member 31, the legs of which are rigidly attached to the bottom of the float 24. Extending downwardly from the extreme bottom of the disc 26, as best seen in Fig. 4, are spaced members 32 and 33 shaped to be received in recesses 34 and 36, respectively, formed on opposite sides of a bridging member 37 of the U-shaped member 31. The latter construction maintains the disc 26 in assembled relation with the bridging member 31 while at the same time permitting sufficient free movement of the disc 26 to insure proper seating thereof. A cage 38 disposed in the container 14 limits the permissible downward movement of the float 24. As shown the cage comprises a ring 39 of less diameter than the maximum diameter of the float 24 and annularly spaced legs 41 shaped to rest on the bottom of the container. The length of the legs 41 and the length of the tube 27 may be varied so that any desired liquid level in the container may be maintained.

Figure 2:
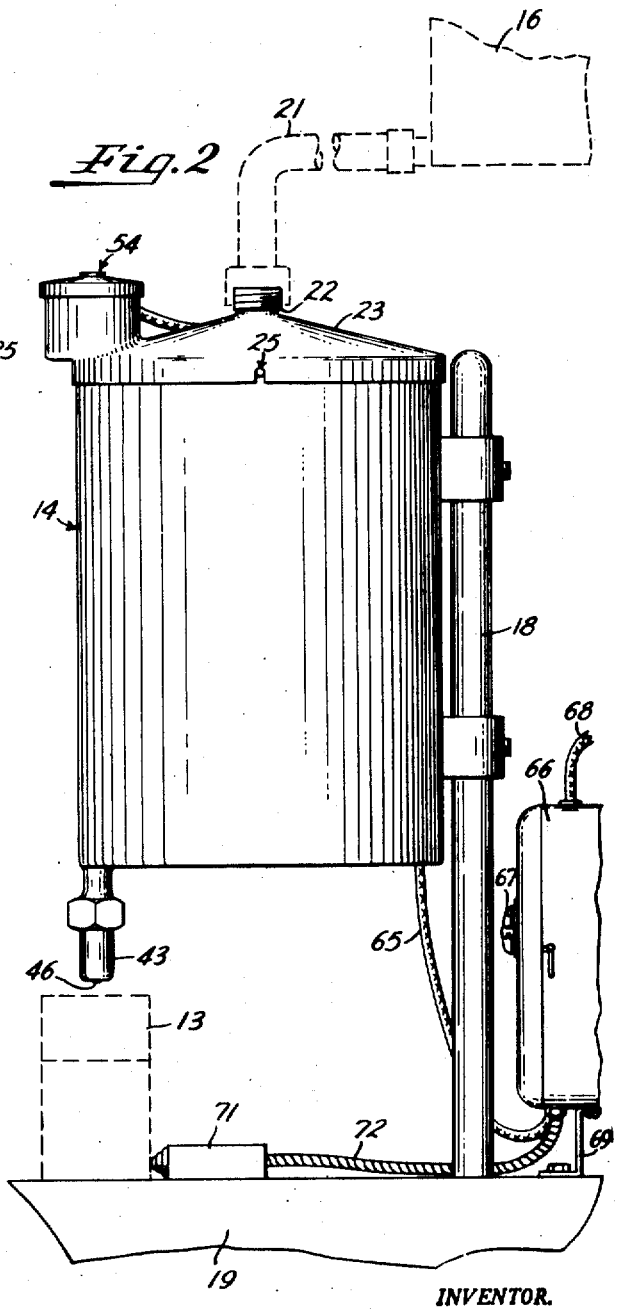
Fig. 2 is a side elevation of the dispensing mechanism shown in Figure 1.

The timer controlled valve means 12 is best shown in Figs. 2 and 3. It includes a discharge nozzle 43 having an opening 44 at one end and a ball valve element 46 shaped to fit in the opening 44 to close the latter. Preferably the land 45 adjacent the opening 44, on the interior of the nozzle is cupped as shown in Fig. 3 to facilitate seating of the ball element 46.

In this instance the nozzle 43 is secured to a flange formed on a downwardly projecting hollow boss 47, as by a detachable coupling element 48. The boss 47 is rigid with the bottom of the container. The abutting surfaces between the flange and the nozzle are preferably frusto-conical shaped as shown so that when the coupling 48 is tightened the nozzle is positively held in engagement with the flange on the boss 47. To prevent leakage of fluid a gasket 49 may be disposed between the flange on the boss 47 and the nozzle 43. The coupling 48 is formed with an annular inturned shoulder 51 shaped to engage a radially projecting shoulder 53 formed on the nozzle 43. With this construction it is relatively easy to unscrew the coupling 48 to remove one nozzle 43 and replace it with a different sized nozzle. The dispensing mechanism may thus be utilized over a wide range of dispensing applications particularly where the different applications require widely varying volumetric displacements. In this embodiment of the invention the ball element 46 is under the control of a solenoid unit 54, disposed in a compartment 56 formed on the top of the cap 23. The solenoid is of conventional construction comprising an inner tubular member 57 shaped to receive a plunger 58, the solenoid coil 59 and an outer sleeve 61 surrounding the solenoid coil 59, all serving their usual functions. The plunger 58 is detachably connected to the upper end of a rod 62 rigidly connected at its opposite end to the ball valve element 46. The arrangement is such that upon energization of the coil 59 the plunger 58 is caused to move upward to unseat the ball valve 46 and upon deenergization of the solenoid coil 59 the ball valve 46 seats itself under the influence of gravity.

A timer 66 is utilized in this instance to control the energization of the solenoid coil 59 through the leads in a conduit 65. Any commercially available interval timer 66 may be used. To simplify the drawings herein the timer is shown only in elevation. Especially good results are obtained with an electronic timer of the type illustrated in Bulletin PC 478 manufactured by Photo Switch Inc., Cambridge 42, Mass., capable of continuous adjustment throughout its timing range. The preselected time intervals may be chosen by means of the dial 67 mounted on the front of the timer 66. Power for the timer is supplied through suitable power leads in a conduit 68. While the timer may be mounted at any convenient location, for purposes of illustration it is shown as being mounted on a bracket 69 rigid with the table top 19. The timer 66 may be actuated by a switch 71 interconnected with the timer 66 by suitable leads in a conduit 72. As shown in Fig. 2 the switch 71 is of the precision snap action type and is mounted on the top of the table 19 beneath the container 14 so that it may be actuated by the receptacle 13 that is to be filled.

The operation of the dispensing mechanism is apparent from the foregoing but may be summarized as follows: The container 14 is filled to a preselected level. The receptacle 13 is moved into position under the nozzle 43. In so doing the receptacle 13 engages and actuates the switch 71. The latter in turn actuates the timer 66 which actuates the solenoid coil 59 and effects the opening of the ball valve 46. The liquid then flows from the container 14 into the receptacle 13. After the preselected time interval has elapsed the timer 66 effects deenergization of the solenoid coil 59 with the result that the ball valve 46 returns to close the opening 44 and stop the flow of fluid from the container 14. The filled receptacle 13 is removed and replaced with an empty receptacle so that the cycle may be repeated.

It is to be understood that as liquid flows from the container 14 into the receptacle 13 the liquid level in the container 14 will tend to drop. This causes the float 24 to move downwardly and the disc 26 is unseated from the end of the tube 27. Liquid from the main supply tank 16 then flows into the container 14. When the level of fluid reaches the predetermined level, the float 24 raises, effecting the seating of the disc 26 on the end of the tube 27 and thereby prevents additional flow of fluid from the supply tank 16 into the container 14. By maintaining the level in the container 14 constant, a constant pressure head for the dispensing mechanism is assured. Because the pressure head is maintained at a substantially constant value and the time intervals during which the valve 12 is open are exactly the same, substantially equal volumes of fluid are discharged from the dispensing mechanism into the receptacles 13 upon successive actuations of the dispensing mechanism. Check runs on installations show that very little variation, determined by weighing filled receptacles, occurs upon successive actuations of the dispensing mechanism.

The volumetric constancy of discharge of the dispensing mechanism of the present invention can probably best be understood by considering the applicable laws of hydraulics. The equation for the steady frictionless discharge from an orifice is one of the first known quantitative relationships in hydraulics and is expressed as follows:

$$V=\sqrt{2gh}$$

where V is the velocity of flow of fluid through the orifice, g is the effect of gravity and has the value of 32.2 feet per second at sea level and h is the head or the distance from the center of the orifice to the top of the fluid which is discharged through the orifice. The volume of liquid discharged through such an orifice at any time is, of course, directly dependent upon the velocity of flow through the orifice and the area of the orifice. By virtue of the constant supply source 16 and the control means such as 17 in Fig. 3 of the drawings for maintaining a constant head in the receptacle 14, the term h in the above equation is also constant. Moreover, since the area of the nozzle is constant for frictionless fluids, the volumetric discharge for a constant time period remains constant. This furthermore is also true even though a frictionless fluid is not involved. All the fluids, of course, have a viscosity factor which will cause a variation in the velocity of discharge through an orifice dependent upon changes in viscosity, but for any particular liquid being dispensed, this viscosity is also constant. Moreover, various orifices have different effects and to take care of this an orifice factor must be included in the general equation. Hence, since the variables of head of liquid, viscosity, area of the orifice, orifice factor and time interval during which the orifice is open to permit discharge therefrom are all constant, the volumetric discharge for each actuation of the dispenser is also constant. There has, therefore, been provided a very simple arrangement for assuring uniform dispensing in a simple manner which eliminates the difficulties of prior art devices discussed above.

Figure 5:
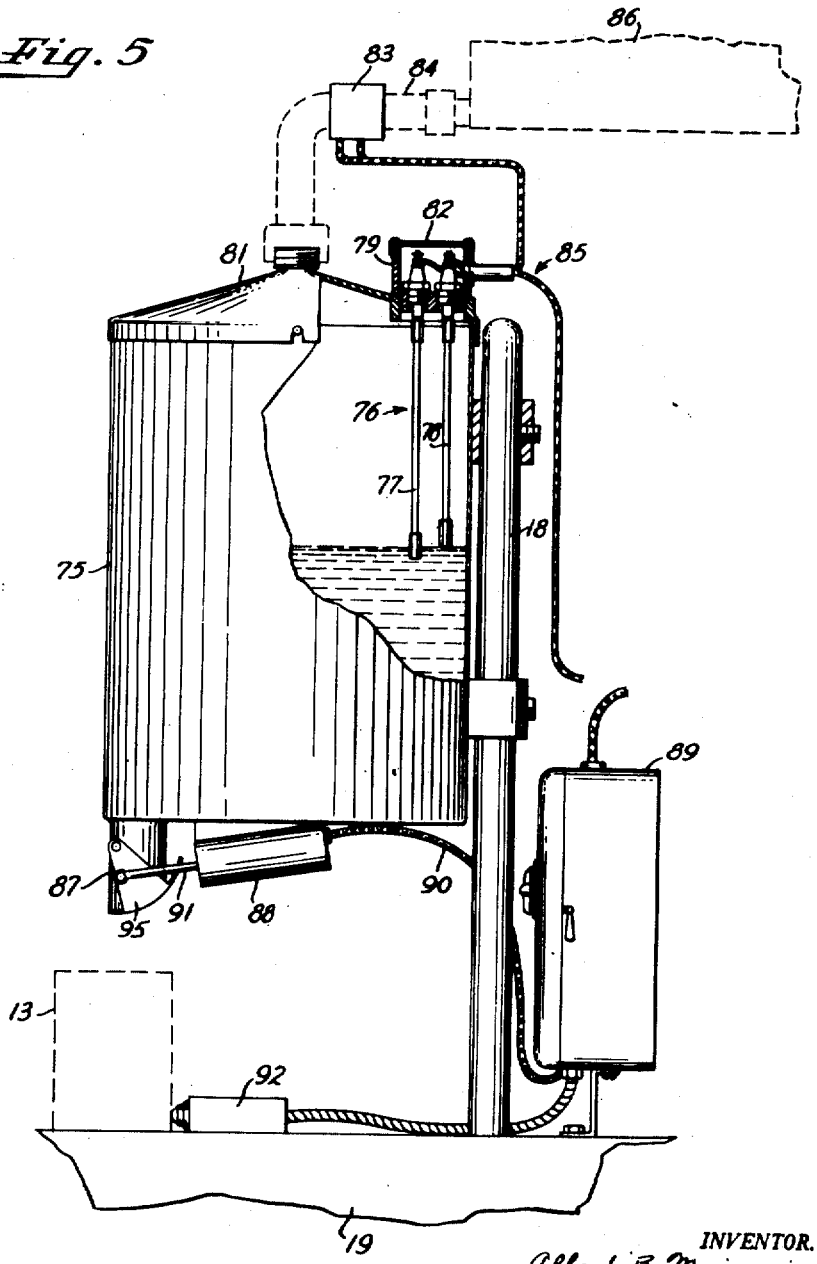

In Fig. 5 there is shown a modification of the invention. In lieu of using a float valve for controlling the liquid level in a dispensing container 75 in this embodiment of the invention, an electrode probe control 76 is used for this purpose. The probe comprises two conventional electrodes 77 and 78 supported in a suitable enclosed mounting 79 threaded into an opening in the removable cap 81 and arranged to project into the interior of the container. Access to the terminals of the probes may be had by removing a cover 82, removably secured to a conventional mounting 79. The probes 77 and 78 are electrically interconnected by suitable electrical connections 85 with a valve 83 disposed in a conduit 84 between a main supply tank 86 and the container 75. When the liquid level in the container 75 goes below a certain preselected level the probe circuit operates to open the valve 83 to permit more liquid to flow into the container 75. When the liquid reaches a preselected lower level the probe circuit operates to close the valve 83. For purposes of illustration the probes 77 and 78 are relatively far apart. By preselecting the high and low levels, however, so that they are relatively close it is to be understood that a relatively constant level can be maintained in the container 75 in the same manner as that described for the float valve construction shown in the embodiment in Figs. 1–4.

The discharge nozzle in this instance is in the form of a molasses gate valve 87 mounted on the bottom of the container 75. The valve 87 is operated by a solenoid unit 88 mounted on the underside of the container 75. The solenoid unit 88 is electrically connected to a conventional interval timer 89 by leads in a conduit 90 and is mechanically connected to the gate valve by a rod 91 pivotally connected to a movable valve element 95 on the valve 87. The timer 89 may be actuated by a switch 92 in the manner described hereinbefore. The general operation of this embodiment of the invention is the same as that described for the first embodiment of the invention.

Figure 6:
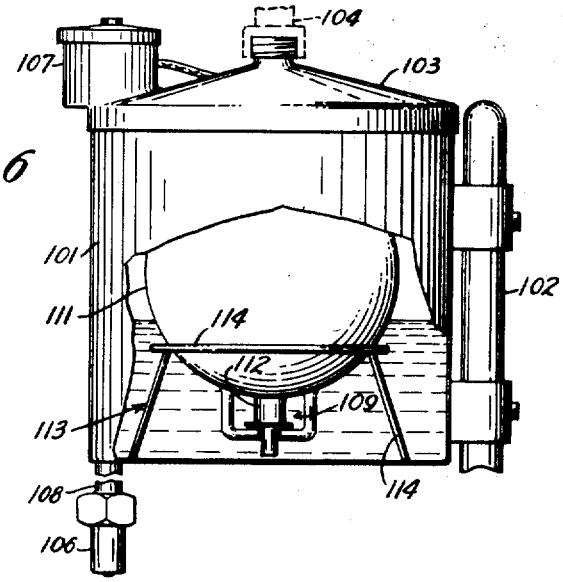

In Fig. 6 there is shown another embodiment of the invention. To simplify the drawings the timer has been omitted since it has the same construction as that described hereinbefore. The construction shown in Fig. 6 is adaptable primarily for applications wherein the quantity of fluid left in the dispensing unit at the conclusion of a dispensing operation is important. In general the construction shown in Fig. 6 is similar to the construction shown in Fig. 3 and includes a container 101 mounted on an upright 102. A cover 103 covers the top of the container 101. A conduit 104 connected to the cover 103 is connected to a fluid supply, not shown, in the manner disclosed for the construction shown in Fig. 3. Fluid is dispensed from the container 101 through a valve 106 controlled by a solenoid operated control unit 107 mounted on the cover 103. The valve 106 is mounted at the end of a tubular member 108 rigid with the bottom of the container that may be of any desired length depending on the desired pressure head for dispensing the fluid. A valve mechanism 109 operated by a float 111 controls the inflow of fluid to the container 101 through a tubular member 112, the latter being in communication with the conduit 104' in the manner shown for the construction disclosed in Fig. 3. The float 111 is mounted on a cage 113 comprising an annular member 114 of smaller diameter than the float 111 and having relatively short supporting legs 112. By making the legs short the float 111 and valve mechanism 109 may be disposed in closely spaced relation to the bottom of the container 101. As a consequence the quantity of fluid left in the container 101 at the conclusion of a dispensing run is very small. This construction is particularly suited to the dispensing of paint and the like materials, where the amount of fluid left in the container at the end of a run is important.

Figure 7:
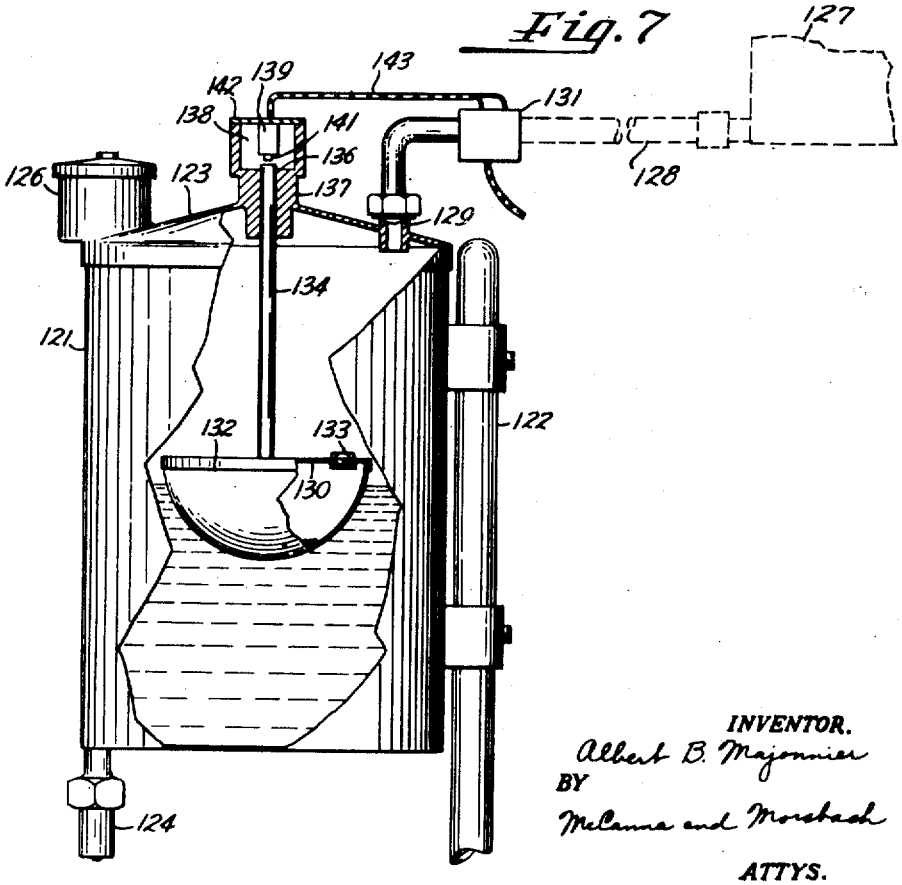

In Fig. 7 there is shown another construction of the dispensing mechanism that is particularly suitable for dispensing fluids such as "Freon" having a relatively high density. To simplify the drawings the timer control has been omitted since it has the same construction as that described hereinbefore. The construction in Fig. 7 includes a container 121 mounted on an upright 122; a cover 123 mounted on top of the container, and a valve 124 at the bottom of the container for dispensing liquid from the container controlled by a solenoid control unit 126 mounted on the cover 123, these parts being constructed in general in the manner disclosed for the construction shown in Fig. 3. The container 121 is in communication with a main supply tank 127 through a conduit 128 connected at one end of the tank 127 and at its opposite end in a conventional manner to a hollow boss 129 on the cover 123. A solenoid operated valve unit 131 is connected in the conduit 128 to control the flow of fluid from the tank 127 to the container 121. The operation of the valve unit 131 is in this instance under the control of a float 132 disposed in the container 121. As shown the float 132 is a hemispherical member having a cover 130. A removable plug 133 is mounted on the cover 130. In some instances the density of the liquid or fluid being dispensed is such that the float must be weighted. Accordingly, shot or the like may be introduced into the float 132 through the opening closed by the plug 133 to properly weight the float. Projecting upwardly from the cover 130 is a vertically disposed rod 134. The latter is rigidly connected to the float and extends through a snug fitting vertically disposed passageway 136 in a boss 137 formed on the cover 123. The upper end of the boss is recessed to define a chamber 138 for a switch 139. As shown the latter is a small precision switch of the normally closed type and is located so that the extreme end of the rod 134 engages a plunger 141 on the switch 139. As shown the switch 139 is mounted on a cover plate 142 and projects downwardly therefrom into the chamber 138. Suitable leads in a conduit 143 connect the switch 139 to the unit 131 and a power source.

In this construction the float 132 moves up and down in response to changes in the level of the fluid in the container 121 as described for the other embodiments. As a consequence the rod 134 is caused to move up and down to thereby actuate the switch 139. The boss 137 in effect defines a guide for the rod 134 in its reciprocatory motion. When liquid is dispensed from the container 121 the float 132 moves downwardly. This causes the rod 134 to move downwardly so that the switch 139 moves to its normally closed position. This effects energization of the solenoid in the unit 131 which in turn opens the valve 131. Liquid thus flows from the main supply tank 127 to the container 121. As soon as liquid flows into the container 121, the level therein rises and the float 132 moves upwardly. This causes the rod 134 to move upwardly to engage the plunger 141 and move the switch 139 to its open position, thereby deenergizing the solenoid in the unit 131 and closing the valve 131 to stop the flow of liquid to the container 121. Thus the liquid level in the container 121 may be maintained substantially constant at any preselected value.

While in each embodiment of the invention there is shown only one dispensing nozzle or valve it is to be understood that any number of dispensing nozzles or valves may be used on a given dispensing container. These valves may be operated independently or may be operated simultaneously. The valves may also be operated manually by an operator or by the receptacle being filled. In some installations a number of dispensing units may be placed in a line so that each operates in succession to fill a receptacle. Where it is desired to control the splash in such an installation the pressure head (or liquid level) maintained in each dispensing unit may be progressively different for each dispensing unit.

One advantage of the construction shown herein is the ease by which the volumetric displacement of the dispensing mechanisms may be adjusted. Because of this, the dispensing mechanism may be quickly and readily changed whenever it becomes necessary, as when the size of the receptacle being filled or the type of fluid is changed. Because of the wide range of applications for these dispensing mechanisms they are, in effect, multi-purpose units.

It is readily apparent from the drawings that these dispensing units are advantageous from an assembly, disassembly and maintenance standpoint. As will be noted the component parts are relatively large and readily accessible and consequently can be readily and thoroughly cleaned. To clean the component parts of the dispensing mechanism such as shown in Fig. 3 it is first necessary to remove the cover 23. When the cover 23 is removed the rod 62 may be readily pulled upwardly to remove it from the container 14. Thus the lower end of the rod and ball 46 may be thoroughly cleaned. The float 24 may be readily removed from the top of the container and because of its configuration may be readily cleaned. A bottle brush may be used to clean the tubular portion 29 of the float 24 and the tubular portion 27 on the cover 23. The connection between the disc 26 and the bridging portion 31 is such that the disc 26 may be readily removed from the bridging portion 31 and thoroughly cleaned. The cage 38 may also be readily removed from the container 14. To clean the nozzle 43 it is only necessary to remove the flange 48 from the projecting flange 43. As soon as the parts are removed from the container 14 the latter may be removed from the standard 18 and submerged in a proper cleaning fluid so that it too may be thoroughly cleaned. Because of the small number of component parts, it is readily apparent that a minimum of time is required to disassemble the unit, to clean the parts and to reassemble them in an operative relation.

While I have shown several embodiments of my invention I do not wish to be limited thereto, since many modifications may be made and I therefore contemplate by the appended claims to cover any such modifications as fall within the true spirit and scope of my invention.

I claim:

1. In a dispensing mechanism, the combination of a fluid container, means for supplying fluid to said container, means in said container operable to maintain the fluid in the container at a preselected level, a valve mounted on the container for dispensing fluid from the container into a receptacle, a solenoid mounted on said container for operating said valve, a member extending through said container for interconnecting said solenoid and said valve, an interval timer for controlling the energization of the solenoid and means to actuate said timer to energize said solenoid and thereby move said member to open said valve, whereby a substantially constant volume of liquid is dispensed each time said solenoid is energized.

2. In a dispensing mechanism, the combination of a container for a free flowing fluid having a removable top and a bottom, means for supplying fluid to said container, said top having a vertically extending tubular member projecting inwardly of the container and in communication with said fluid supply, detachable valve means mounted on said bottom for dispensing fluid from the container, a float member having a tubular passageway shaped to receive said tubular member, and a disc supported by said float member and shaped to seat on the end of the tubular member to control the flow of fluid from said fluid supply means to said container, said float being operable in response to a lowering of the fluid level below a preselected level to unseat the disc and effect a flow of fluid to the container and operable when the level is raised to a preselected level to seat the disc to prevent the flow of fluid to the container, said removable top and said detachable valve permitting the disassembly of the dispensing mechanism to permit cleaning of the elements of the dispenser.

3. In a dispensing mechanism, the combination of a container for a free flowing fluid having a removable top and a bottom having a discharge opening therein, means for supplying fluid to said container, said top having a vertically extending tubular member projecting inwardly of the container and in communication with said fluid supply, detachable valve means mounted on the bottom of said container to control the flow of fluid through the discharge opening, a solenoid mounted on said container, a member extending through said container and interconnecting the solenoid and the valve, an interval timer for controlling the energization of the solenoid, means for actuating the timer to energize the solenoid and move the member to open the valve, a float member having a tubular passageway shaped to receive said tubular member, and a disc supported by said float member shaped to seat on the end of the tubular member to place the tubular member in and out of communication with the interior of the container, said float being operable in response to a lowering of the fluid level below a preselected level to unseat the disc to effect flow of fluid to the container and operable when the level is raised to a preselected level to seat the disc to prevent flow of fluid to the container whereby the fluid is maintained at a substantially constant level so that each actuation of the solenoid causes the valve to discharge equal volumes of fluid from said container, said detachable valve and removable top permitting the disassembly of the dispensing mechanism to permit cleaning of the elements of the dispenser.

4. In a dispensing mechanism, the combination of a container for a free flowing fluid having a removable top and a bottom, means for supplying fluid to said container, said top having a vertically extending tubular member projecting inwardly of the container and in communication with said fluid supply, detachable valve means mounted on said bottom for dispensing fluid from the container, actuating means mounted on said container for opening and closing said valve, timing means for controlling the actuation of said actuating means to open said valve at predetermined intervals for a preselected duration, a float member having a tubular passageway shaped to receive said tubular member, a substantially U-shaped arm secured to said float member, a slotted member in engagement with said U-shaped member and movable therewith, a disc secured to said slotted member and shaped to seat on the end of the tubular member to control the supply of fluid from said fluid supply means to said container, said float being operable in response to a lowering of the fluid level below a preselected level to cause the U-shaped member to move within the slotted member and unseat the disc to effect flow of fluid to the container and operable when the level is raised to a preselected level to cause the U-shaped member to raise the disc and stop the flow of fluid from the fluid supply means whereby the fluid within said container is maintained at a substantially constant level and equal volumes of fluid are discharged for each actuation of the valve, cage means disposed within said container to limit the downward movement of the float and maintain the fluid in the container at a low level to prevent splashing when the fluid is dispensed, the removable top and the detachable valve permitting the disassembly of the dispensing mechanism so that the elements of the dispenser may be cleaned.

5. In a dispensing mechanism, the combination of a container for a free flowing fluid having a removable top and a bottom, means for supplying fluid to said container, said top having a vertically extending tubular member projecting inwardly of the container and in communication with said fluid supply, detachable valve means mounted on said bottom for dispensing fluid from the container, a solenoid mounted on said container for opening and closing said valve, a member extending within said container for interconnecting the valve and the solenoid, timing means for controlling the actuation of said solenoid to open said valve at predetermined intervals for a preselected duration, a float member having a tubular passageway shaped to receive said tubular member, a substantially U-shaped arm secured to said float member, a slotted member in engagement with said U-shaped member and movable therewith, a disc secured to said slotted member and shaped to seat on the end of the tubular member to control the supply of fluid from said fluid supply means to said container, said float being operable in response to a lowering of the fluid level below a preselected level to cause the U-shaped member to move within the slotted member and unseat the disc to effect flow of fluid to the container and operable when the level is raised to a preselected level to cause the U-shaped member to raise the disc and stop the flow of fluid from the fluid supply means whereby the fluid within said container is maintained at a substantially constant level and equal volumes of fluid are discharged for each actuation of the valve, and cage means disposed within said container to limit the downward movement of said float to maintain the U-shaped member within the slotted member and to maintain the fluid level in the container at a low level to prevent splashing when the fluid is dispensed, the removable cap and the detachable valve permitting the facile disassembly of the dispensing mechanism to permit cleaning of the elements of the dispenser.

*6. A filling machine for delivering an accurately controlled predetermined quantity of milk and other free flowing fluids for the repetitive filling of individual milk containers and the like each in a single complete operation, the combination of a relatively large main fluid supply tank; a fluid supply container having a fluid capacity substantially smaller than said main supply tank and larger than the quantity to be delivered in filling said individual containers; said fluid supply container being provided with a bottom delivery outlet having a given orifice factor and area of orifice, through which outlet orifice the fluid freely flows by gravity; a valve in said bottom outlet operable between an open position in which the fluid flows for delivery into an individual container positioned beneath and in filling coaction with said outlet and a closed position for stopping said flow; means operable to deliver said fluid from said main tank to said fluid supply container and to maintain a substantially constant preselected hydrostatic head of the fluid in said supply container, said hydrostatic head having a predetermined value with relation to said orifice factor and area of orifice whereby to effect controlled relatively rapid continuous flow of the fluid from the supply container to the said individual container when the latter is in said filling position; and a timer for controlling the operation of said valve, said timer having a starting switch and operating to control a continuous uninterrupted time period in response to the initial actuation of said switch, said timer controlling said valve to continuously hold open said valve throughout said time period whereby to deliver said predetermined flow and quantity of fluid in a single complete operation to each said individual container and whereby the preselected constant factors of said hydrostatic head in the supply container and said orifice delivery produce relatively rapid filling of said individual container and control of splash effect of the fluid in its discharge into the said individual container, said timer being adjustable to vary said time period and the predetermined quantity of fluid delivered to each individual container.*

*7. A filling machine for delivering an accurately controlled predetermined quantity of milk and other free flowing fluids for the repetitive filling of individual milk containers and the like each in a single complete operation, the combination of a large source of fluid, a fluid supply container having a fluid capacity substantially smaller than said source and larger than the quantity to be delivered in filling said individual containers, a fluid delivery line interconnecting said source and said supply container, a valve operable to control the flow of fluid through said fluid delivery line into said supply container, the supply container being provided with a bottom delivery outlet having a given orifice factor and area of orifice through which outlet orifice the fluid freely flows by gravity, a valve in said outlet operable between an open position in which the fluid flows for delivery into an individual container located beneath said supply container and a closed position for stopping said flow, a float in said supply container operable to control the first mentioned valve to replace the fluid in said supply container as it is dispensed and also operable to maintain the fluid in the supply container at a preselected level and providing a hydrostatic head of predetermined value with relation to said orifice factor and area of orifice whereby to effect controlled relatively rapid continuous flow of the fluid from the supply container to said individual container when the second mentioned valve is held open, a solenoid for operating said second mentioned valve, operating means interconnecting said second mentioned valve and said solenoid, and an interval timer for controlling the energization of said solenoid to continuously hold open said second mentioned valve for a preselected time period to control a continuous uninterrupted flow delivery of the fluid to said individual container whereby the preselected constant factors of said hydrostatic head in the supply container and said orifice delivery produce relatively rapid filling of said individual container and control of splash effect of the fluid in its discharge into said individual container, said timer being adjustable to vary said time period and the predetermined quantity of fluid delivered to each individual container.*

(References on following page)

References Cited in the file of this patent or the original patent

UNITED STATES PATENTS

| Number | Name | Date |
|---|---|---|
| 1,381,442 | Thompson | June 14, 1921 |
| 1,531,007 | Jackson | Mar. 24, 1925 |
| 1,553,385 | Kohr | Sept. 15, 1925 |
| 1,613,248 | Searing | Jan. 4, 1927 |
| 2,254,833 | Ashkenaz | Sept. 2, 1941 |
| 2,308,960 | Stevens | Jan. 19, 1943 |
| 2,392,054 | McKinnis | Jan. 1, 1946 |
| 2,396,527 | Osborne | Mar. 12, 1946 |
| 2,462,019 | Bowman | Feb. 15, 1949 |
| 2,515,363 | Warren | July 18, 1950 |